United States Patent [19]

Ballinger

[11] Patent Number: 4,741,308

[45] Date of Patent: May 3, 1988

[54] ROTARY INTERNAL COMBUSTION ENGINE AND METHOD OF OPERATION

[76] Inventor: Michael S. Ballinger, 6115 156th Northeast, Redmond, Wash. 98052

[21] Appl. No.: 896,933

[22] Filed: Aug. 15, 1986

[51] Int. Cl.$^4$ .............................................. F02B 53/00
[52] U.S. Cl. ..................................... 123/231; 418/227
[58] Field of Search ....................... 123/228, 229, 231; 418/225, 227

[56] References Cited

U.S. PATENT DOCUMENTS

| | | |
|---|---|---|
| 1,136,344 | 4/1915 | Keil . |
| 1,193,808 | 8/1916 | McCarthy . |
| 1,246,885 | 11/1917 | Conklin . |
| 1,294,771 | 2/1919 | Conklin . |
| 1,319,932 | 10/1919 | Stevenson . |
| 1,455,324 | 5/1923 | Cushman . |
| 2,136,066 | 11/1938 | Walters et al. . |
| 2,454,006 | 11/1948 | Plummer . |
| 3,096,745 | 7/1963 | Thompson . |
| 3,820,513 | 7/1974 | Buettner . |

FOREIGN PATENT DOCUMENTS

| | | | |
|---|---|---|---|
| 3141753 | 5/1983 | Fed. Rep. of Germany | 418/227 |
| 1337661 | 8/1963 | France | 418/227 |
| 23495 | 6/1972 | Japan | 418/227 |
| 5502 | 1/1982 | Japan | 123/231 |
| 1362686 | 8/1974 | United Kingdom | 123/229 |

*Primary Examiner*—Michael Koczo
*Attorney, Agent, or Firm*—Delbert J. Barnard

[57] ABSTRACT

A rotor (30) is formed to include a plurality of recesses (42, 44), each of which engages a portion of a rotary piston (36, 38). The remaining portions of the rotary pistons (36, 38) project radially outwardly from the periphery of the rotor (30) to a position contiguous the inner surface of a peripheral stator wall (14). The peripheral stator wall (14) includes a plurality of endwardly projecting lobes (156, 158). The lobes (156, 158) are elongated axially of the engine and present convex surfaces of circular curvature which conform in size and shape to concave pockets (46, 48) formed in side portions of the rotary pistons (36, 38). During rotation of the rotary assembly the piston pockets (46, 48) move into and then out from a meshing engagement with the lobes (156, 158). One of the lobes (156) carries an igniter (154). An explosive lean mixture (168) is drawn into the side pocket (46) of a piston (36) as the piston (36) moves past an inlet opening (150). This mixture is compressed by the engagement of the piston pocket (46) and the lobe (156). Ignition of the compressed charged creates an explosive force acting on the rotor assembly, causing it to rotate.

8 Claims, 5 Drawing Sheets

ROTARY INTERNAL COMBUSTION ENGINE AND METHOD OF OPERATION

TECHNICAL FIELD

The present invention relates to rotary internal combustion engines. More particularly, it relates to the provision of a new type of rotary engine which provides a large torque for its mass, which operates on a lean fuel air mixture, and which requires no contact seals between the rotor and the stator.

BACKGROUND ART

Examples of rotary internal combustion engines present in the patent literature are shown by the following U.S. patents: U.S. Pat. Nos. 1,136,344, granted Apr. 20, 1915 to Lewis E. Keil; 1,193,808, granted Aug. 8, 1916 to Ivan A. McCarth; 1,246,885, granted Nov. 20, 1917 to Bruce Conklin; 1,294,771, granted Feb. 18, 1919 to Bruce Conklin; 1,319,932, granted Oct. 28, 1919 to Samuel B. Stevenson; 1,455,324, granted May 15, 1923 to Trav Cushman; 2,136,066, granted Nov. 8, 1938 to Arthur L. Walters and Harv H. Hendricks; 2,454,006, granted Nov. 16, 1948 to Carl E. Plumber; 3,096,745, granted July 9, 1963 to Standish F. Thompson; and 3,820,513, granted June 28, 1974, to Otto A. Buettner.

The engine of the present invention is in some respects similar to the engine disclosed by U.S. Pat. No. 3,096,745. It has no resemblance to any of the engines shown by the other patents.

DISCLOSURE OF THE INVENTION

The engine of the present invention is basically characterized by a stator having a plurality of lobes which project radially inwardly from a peripheral wall towards a rotor assembly that is mounted for rotation in the stator. Each lobe conforms in size and shape to side pockets formed in rotary pistons which are a part of a rotor assembly. The rotary pistons are geared to a main rotor by planetary gearing which causes the rotary pistons to rotate in a direction opposite to the direction of rotation of the main rotor. Movement of a rotary piston past an inlet causes an explosive mixture of fuel and air to be drawn into the side pocket of the rotary piston. This pocket closes upon further rotation of the piston and then opens again as the piston approaches a lobe. The side pocket of the rotary piston and the lobe meshes together and compresses the explosive charge into a quite small space at the base of an ignition device. Ignition of the explosive mixture creates an explosive force acting against the rotary piston, to cause rotation of the rotor assembly. The compression ratio is very high, permiting the engine to operate on an extremely lean fuel air mixture.

Other more detained features of the invention are described below as a part of the description of the best mode of the invention.

BRIEF DESCRIPTION OF THE DRAWING

Like reference numerals are used to designate like parts throughout the several views of the drawings, and.

BEST MODE FOR CARRYING OUT THE INVENTION

Figure 1:
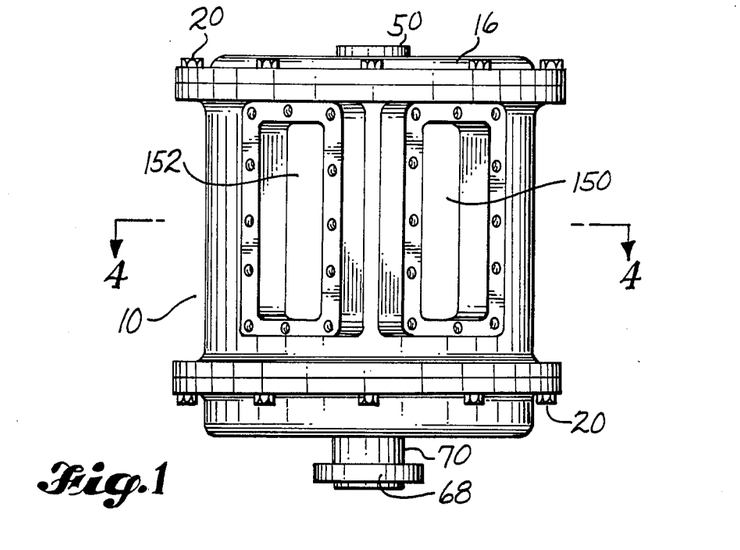
FIG. 1 is a side view looking towards a first embodiment of the invention, showing a side-by-side inlet and outlet.
Figure 2:
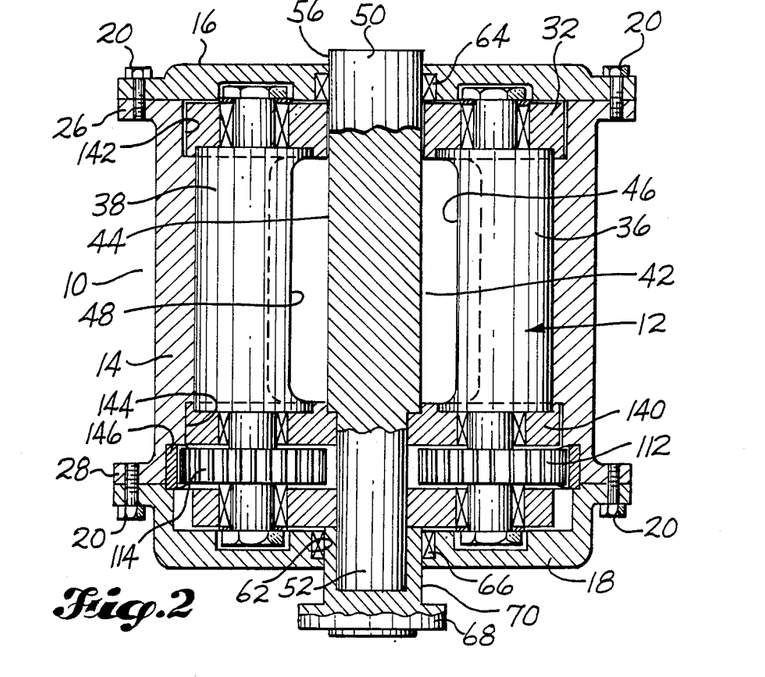
FIG. 2 is a longitudinal sectional view, taken substantially along line 2—2 of FIG. 6, with some parts in elevation.

The embodiment shown by FIGS. 1-8 comprises a stator 10 and a rotor assembly 12 (FIG. 2). The stator 10 comprises a peripheral wall 14 and a pair of end walls 16, 18. The end walls 16, 18 may be secured to the peripheral wall 14 by a plurality of bolts 20. The bolts 20 are shown to extend through openings in border portions of the end walls 16, 18. Bolts 20 then screw into internally threaded openings 24 provided in end flanges 26, 28 located at the opposite ends of the peripheral wall 14.

Figure 3:
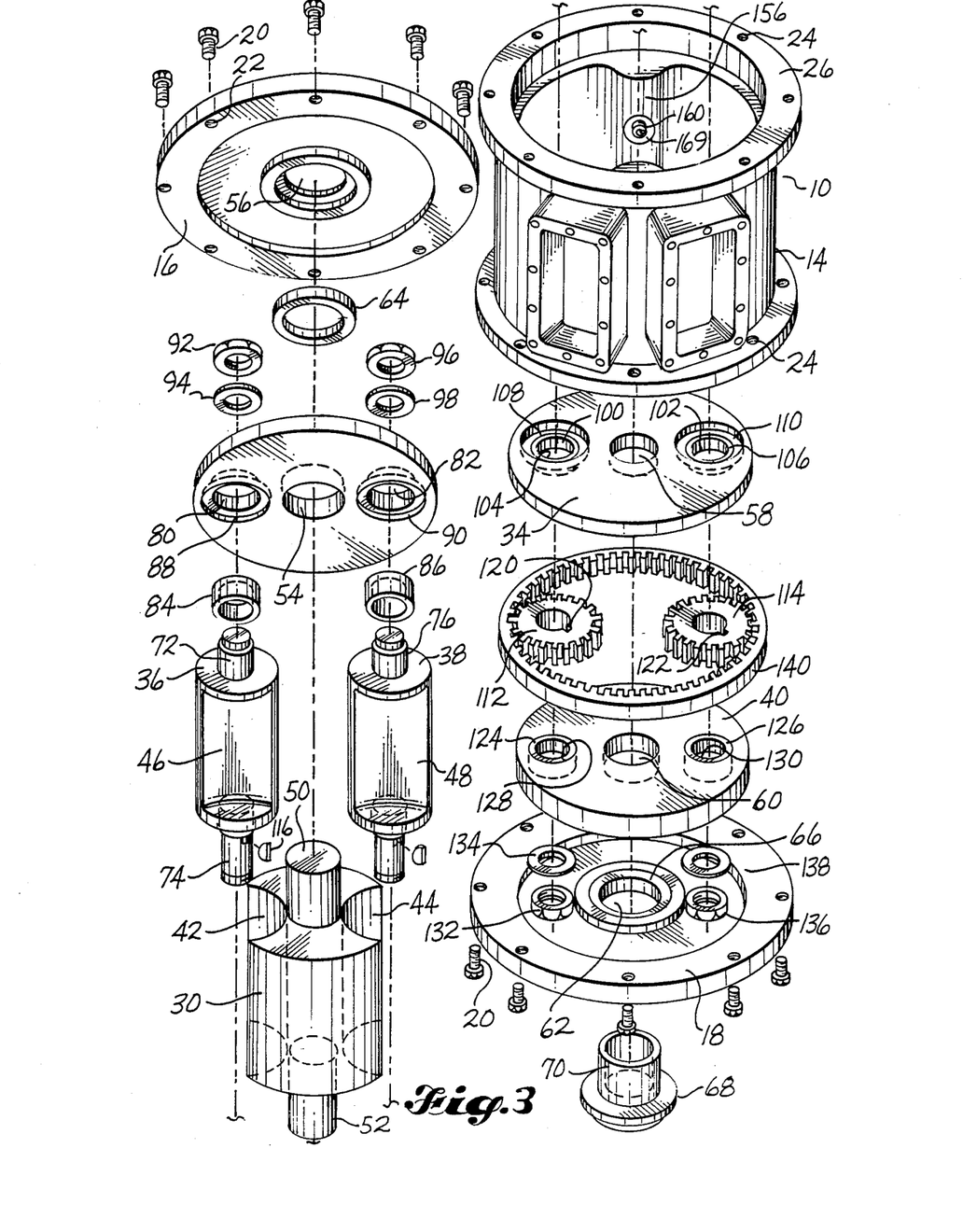
FIG. 3 is an exploded isometric view of the embodiment shown by FIGS. 1 and 2.

Referring to FIG. 3, the rotor assembly 12 comprises a main rotor 30, a pair of rotor end plates 32, 34, a pair of rotary pistons 36, 38 and a rotary support plate 40.

The main rotor 30 comprises a pair of piston recesses 42, 44. The recesses 42, 44 open radially outwardly of the main rotor 30 and are elongated axially of the main rotor 30. Each recess 42, 44 has a concave base wall of circular curvature substantially conforming to the curvature of the rotary pistons 36, 38. The rotary pistons 36, 38 comprise radially outwardly opening side pockets 46, 48. The rotary pistons 36, 38 have a basically circular cross section modified by the pockets. The recesses 42, 44 engage portions of the pistons 36, 38. The remaining portions of the pistons 36, 38 project radially outwardly from the outer periphery of the main rotor 30.

In preferred form, the main rotor 30 includes a pair of end shafts 50, 52 which extend endwise of the main rotor 30. End shaft 50 fits first through a center opening 54 in rotor plate 32 and then through a center opening 56 in stator end wall 16. End shaft 52 extends through a center opening 58 in rotor plate 34, then through a center opening 60 in rotary support plate 40, then through the center opening 62 in the stator end wall 18.

Suitable bearings 64, 66 may be provided in the stator end wall openings 56, 62. End shaft 50 is supported for rotation within bearing 56. An output element 68 may be secured to the end shaft 52, in the manner illustrated by FIG. 2. The output element 68 includes a tubular portion 70 which fits into the bearing 66 and over the end of end shaft 52.

In preferred form, each rotary piston 36, 38 includes a pair of end shafts. The end shafts of rotary piston 36 are designated 72, 74. The end shafts of rotary piston 38 are designated 76, 78. End shafts 72, 76 extend through openings 80, 82 in rotor end plate 32. Bearings 84, 86 fit within the openings 80, 82, and receive the end shafts 72, 76. Rotor end plate 32 is formed to include recesses 88, 90 which extend about the openings 80, 82 and receive the near end portions of the rotary pistons 36, 38. A nut and washer assembly 92, 94 is secured to a threaded outer end portion of end shaft 72, on the side of rotor end plate 32 opposite the recess 88. In similar fashion, a nut and bolt assembly 96, 98 is secured to a threaded end portion of end shaft 76 on the side of rotor end plate 32 opposite the recess 90.

At the opposite end of the rotor assembly, openings 100, 102 are provided in the second rotor end plate 34. Bearings 104, 106 are provided in these openings 100, 102. The rotor end portions 74, 76 of the rotary pistons 36, 38 fit through these bearings 104, 106. Recesses 108, 110 are provided in the rotary end plate 34, about the openings 100, 102, and are sized to receive the adjacent end portions of the rotary pistons 36, 38.

At this end of the rotor assembly, the piston end shafts 74, 76 extend through and are keyed to a pair of planet gears 112, 114. The keys are designated 116, 118 and the keyways are designated 120, 122 (FIG. 3).

The rotary piston end shafts 74, 78 next extend through bearings 124, 126 which are fitted within openings 128, 130 provided in the rotary support plate 40. A nut and washer assembly 132, 134 is connected to the threaded outer end portion of piston end shaft 74. The second nut washer assembly 136, 138 is connected to the threaded end portion of piston end shaft 78.

When the nuts 92, 96, 132, 136 are tightened, the rotor end plates 32, 34 and the rotary support plate 40 are secured to the rotary pistons 36, 38. However, the bearings 84, 86, 124, 126 permit rotation of the rotary pistons 36, 38 relative to the various plates 32, 34, 40. The plates 32, 34, 40 are keyed or spline connected to the end shafts 50, 52 of the main rotor 30, so that these plates 32, 34, 40 nd the main rotor 30 all rotate together.

An internal tooth-type ring gear 140 is located within the stator 10, at the outlet end of the peripheral wall 14. Gear 140 is fixed in position relative to the peripheral wall 14.

As shown by FIG. 2, annular grooves or recesses may be formed in the opposite ends of the peripheral wall 14 for receiving the outer peripheral portions of the rotor end plates 32, 34. The groove in which rotor end plate 32 is received is designated 142 in FIG. 2. The groove in which rotor end plate 34 is received is designated 144. A similar but larger diameter groove 146 is formed axially outwardly of groove 144, for receiving the ring gear 140. The ring gear 140 may be secured in any suitable fashion to the surrounding wall portion fo the peripheral wall 14.

The planet gears 112, 114 mesh with the ring gear 140 and serve to connect the rotary pistons 36, 38 to the remaining components of the rotor assembly, for affecting the timing of the rotary pistons 36, 38 relative to an inlet 150, and an outlet 152, and an ignition station 154.

As shown by FIGS. 4–7, in the first embodiment, the stator wall 14 includes a pair of diametrically opposed lobes 156, 158. These lobes extend axially of the stator and have a convex cross section of circular curvature matching the curvature of the base walls of the pockets 46, 48 formed in the rotary pistons 36, 38. The igniter 154 is positioned within the lobe 156. It may include a threaded end portion 159 which is threaded into an internally threaded opening 160. The inward end of the opening 160 communicates with a cavity 169 which opens inwardly towards the interior of the stator 10.

In describing the sequence of operation shown by FIGS. 4–7, the lobe 158 will be referred to as the first lobe and the lobe 156 will be referred to as the second lobe. The inlet 150 opens into a chamber space that is defined radially between the main rotor 30 and the peripheral wall 14, axially between the rotor end plates 32, 34, and angularly between the lobes 158, 156. Inlet 150 is located closely adjacent lobe 158. The outlet 152 leads out from a chamber space that is defined radially between the main rotor 30 and the peripheral wall 14, axially between the rotor end plates 32, 34, and angularly between the lobes 156, 158. In this embodiment the outlet 152 is positioned closely adjacent the lobe 158, on the opposite side of it from the inlet 150.

Figures 4, 5:
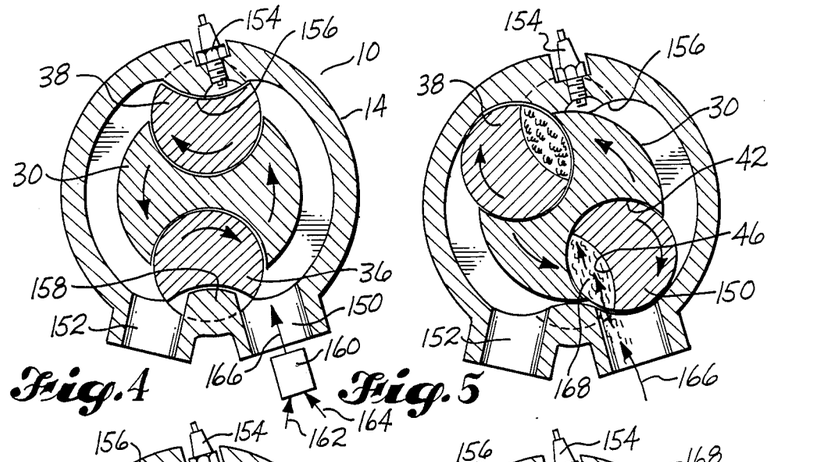
FIG. 4 is a cross sectional view taken substantially along line 4—4 of FIG. 1, and showing the position of the rotor and the rotary pistons at substantially the instant that the igniter is operated to ignite a compressed charge.
FIG. 5 is a view like FIG. 4, but showing the rotor and the rotary positions rotated in position a small amount following ignition and showing a new charge entering through the inlet.
Figure 6:
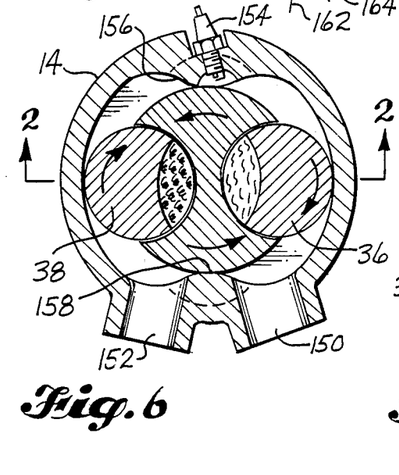
FIG. 6 is a view like FIGS. 4 and 5, but showing the rotor and the rotary pistons rotated substantially ninety degrees past ignition.
Figure 7:
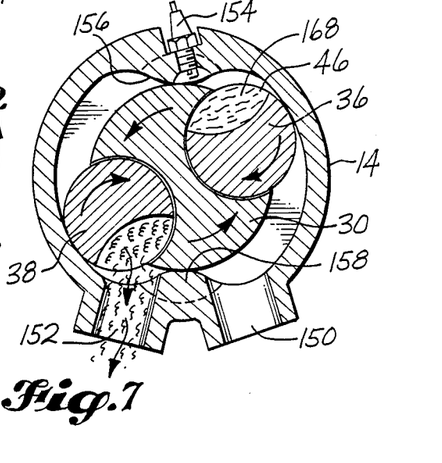
FIG. 7 is a view like FIGS. 4-6, showing a further rotation of the rotor and the rotary pistons, showing an initial stage of compression in the vicinity of the igniter, and further showing exhaust gases being exhausted.
Figure 8:
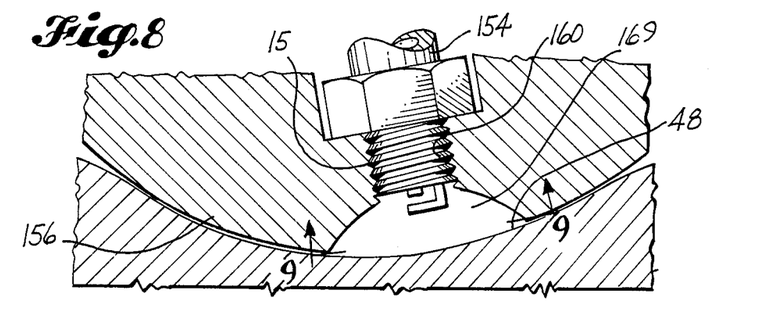
FIG. 8 is an enlarged scale fragmentary view in the vicinity of the igniter substantially at the instant of ignition.

A suitable type of carburation device 160 is provided at the inlet 150. A fuel source 162, and an air source 164 delivers fuel and air to the device 160 which thoroughly mixes them together and delivers them into the inlet 150 as an explosive charge or mixture 166. Rotation of a rotary piston (e.g. piston 36) past the inlet 150 will draw some of the explosive mixture 166 into the inlet 150, to provide an explosive charge. A charge 168 of this mixture is drawn into a chamber space that is defined between the concave base wall of the rotary piston 36 and the concave base wall of the recess 42 in main rotor body 30. This is shown in FIG. 5. As the rotor assembly rotates further, the charge 168 is moved towards the second lobe 156. As the main rotor body 30, and the rotor end plates 32, 34 rotate counterclockwise, for example, the rotary pistons 36, 38 rotate in the opposite direction, i.e. clockwise. As a result of this rotational coordination, the rotary piston pocket 46 is swung into a position of engagement with the lobe 156. As the rotor assembly 30, 32, 34 rotates and the rotary piston 36 swings into position, the radial boundaries of the pocket in which the carge 168 is received progressively decreases in size and as this happens the charge 168 is compressed. When the rotary piston 36 is positioned directly opposite the lobe 56, there is near contact between the base wall of the pocket 46 and the convex surface of the lobe 56, in the region surrounding the cavity 169, and the charge 168 is tightly compressed within the cavity 169. Shortly following movement of the rotary assembly 30, 32, 34 past a dead center position, the igniter 154 is energized, to ignite the explosive mixture 168 within the cavity 169. The explosion gives an immediate impulse or kick to the rotor assembly 30, 32, 34, primarily by means of a tangential force acting on the rotary piston (e.g. piston 38 in FIG. 5), and reacted by a surface of the lobe 156 behind the rotary piston.

The engine of the present invention makes it possible to use a relatively lean fuel air mixture. That is because the compression ratio is quite high. The volume of the space defined between the concave base wall of the rotary piston and the concave base wall of the recess in which the rotary piston is received is reduced down from a volume having the length of the main rotor 30 and the cross sectional area shown in FIG. 5, to the size of the quite small cavity 169 at the end of the ignition device 154, shown in FIGS. 8 and 9. This highly compressed lean mixture ignites with an explosion which applies a sudden increment of rotational force on the rotor assembly.

It is anticipated that the various parts of the rotor and the stator may be made hollow to provide cooling chambers in which a suitable liquid coolant is introduced.

There is a close tolerance between the ends of the rotary pistons 36, 38 and the cavities 88, 90, 108, 110 in the end plates 34, 36, and between the outer periphery of the rotary pistons 36, 38 and the inner surface of peripheral wall 14, and between the outer periphery of the regions of the main rotor body 30 which are between the pistons 36, 38 and the innermost surface portions of the lobes 156, 158. The rotary pistons 36, 38 also make a close tolerance fit within the recesses 42, 44. Further, there is a close tolerance fit of the lobes 156, 158 to the surfaces of the pockets 46, 48 and firing chamber 169 is small. As a result of this construction, and further because of the large compression ratio, the use of a relatively lean fuel air mixture, and the short duration explosive kick given by the ignited mixture to the rotor assembly, contact seals between the rotating and nonrotating parts are not necessary. The small gaps between the parts provide all of the sealing that is necessary.

The embodiment shown by FIGS. 1-9 fires twice per each rotation of the rotor assembly. It fires each time that a rotary piston 36, 38 compresses an explosive charge into the ignition chamber 162.

Figures 9, 10:
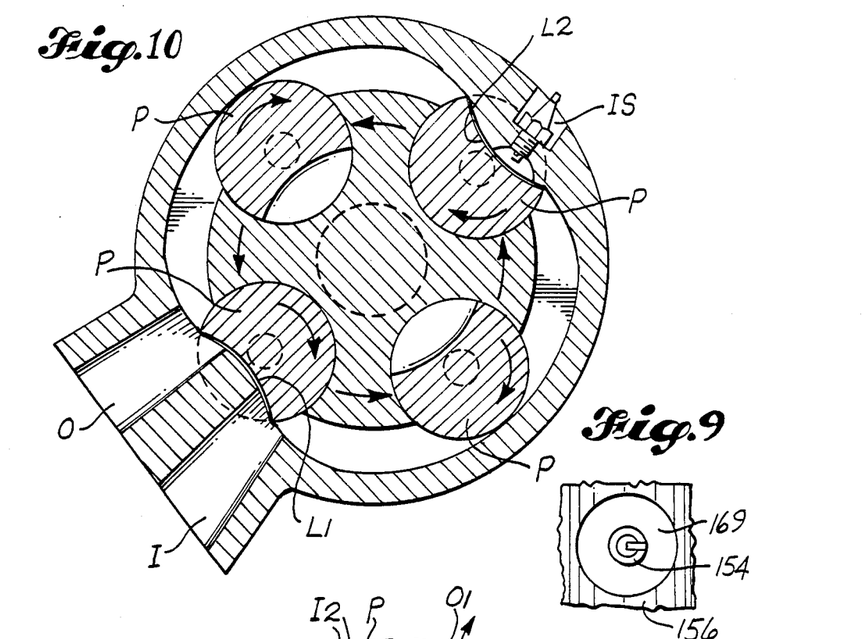
FIG. 9 is a fragmentary sectional view taken substantially along line 9—9 of FIG. 8, and about one half the scale of FIG. 8.
FIG. 10 is a cross-sectional view like FIG. 4, but of a second embodiment of the invention.
Figure 12:
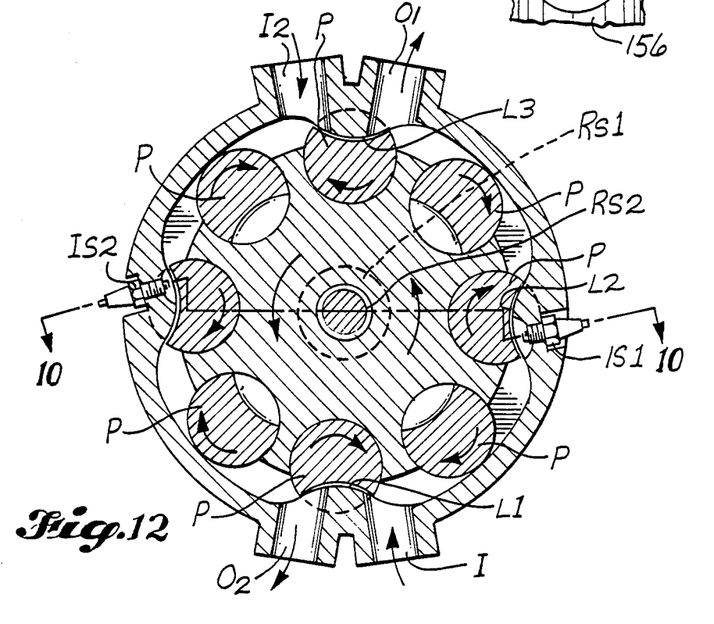
FIG. 12 is a cross-sectional view taken substantially along line 12—12 of FIG. 11.

FIGS. 10 and 12 show two possible modifications. FIG. 10 shows a single inlet I, a single outlet O, a single ignition station 15, two lobes L1, L2, but four pistons P. This embodiment fires four times per revolution of the rotor assembly.

The embodiment of FIG. 12 has two inlets $I_1$, $I_2$, two outlest $O_1$, $O_2$, four lobes L1, L2, L3, L4, two ignition stations IS1, IS2, and eight rotary pistons P. this embodiment fires sixteen times per revolution of the rotor assembly.

Figure 11:
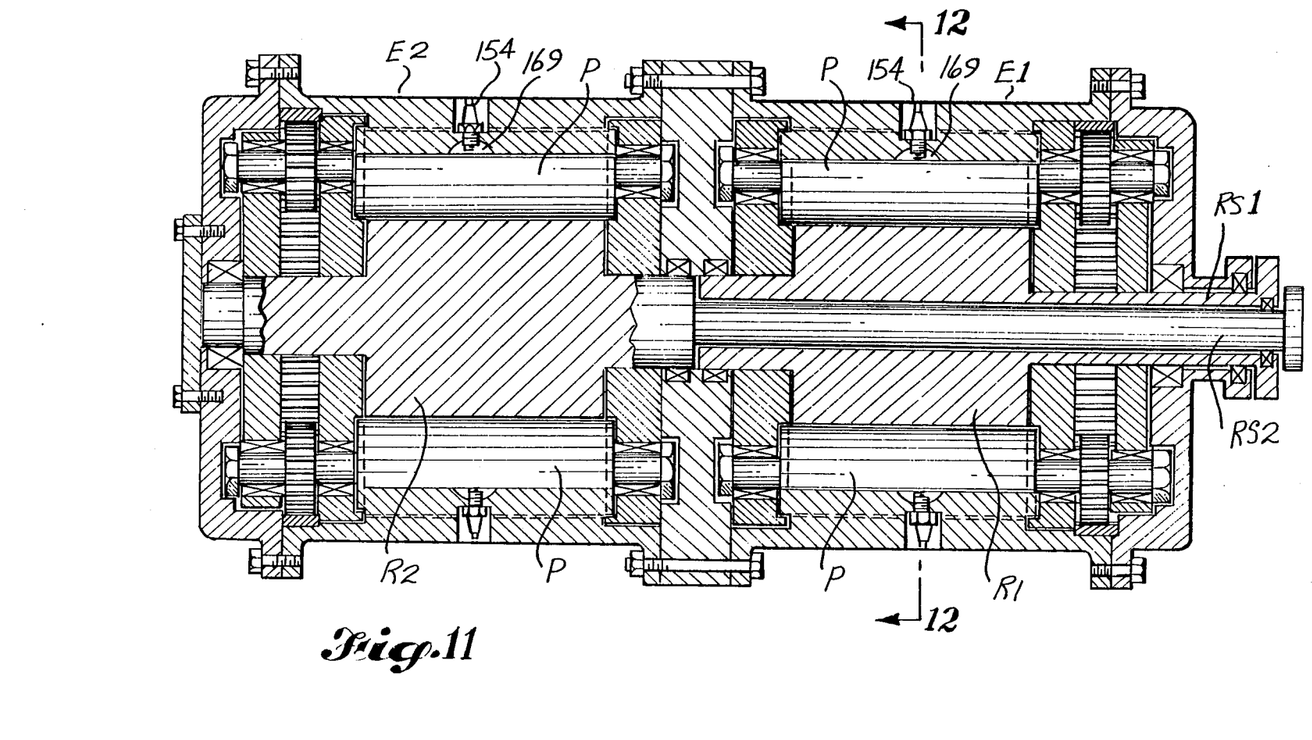

The gearing together of the rotary pistons and the main rotor body, the construction of the rotor assembly and the construction of the stator, for the embodiments shown by FIGS. 10-12 are like what has been described above in connection with the embodiment of FIGS. 1-9.

FIGS. 11 and 12 show that a pair of engines constructed in accordance with the present invention can be arranged end-to-end, with their output shafts counter rotating. Each engine section E1, E2 is essentially constructed like the engine shown by FIGS. 1-9. However, the direction of rotation of the rotor R2 of engine section E2 is opposite to the direction of rotation of the rotor R, of the engine section E1; the rotor shaft RS1 of engine E1 is hollow, and the rotor shaft RS2 of engine E2 extends axially through the output shaft of engine section E1. The gearing and stator construction are essentially as shown by FIG. 2. Therefore, they will not be described again.

The engine shown by FIGS. 11 and 12 can be used in any installation in which a counter rotating drive is desired (e.g. a boat or aircraft).

In each embodiment, the gearing used causes each piston to rotate three hundred and sixty degrees about its axis of rotation per each revolution of the main rotor. This is clearly illustrated in FIGS. 4-7, 10 and 12.

The embodiments which have been illustrated and described serve to provide an understanding of the invention but such embodiments are not to be used to directly limit the scope of protection. The invention is defined not by the embodiments but by the appended claims, interpreted in accordance with established rules of patent claim interpretation, including the doctrine of equivalents.

What is claimed is:

1. A rotary internal combustion engine, comprising:
   a stator including a peripheral wall and a pair of end walls defining a chamber;
   a rotor within said chamber mounted for rotation about a center axis, said rotor including a periphery and a plurality of angularly spaced apart, radially outwardly opening recesses in said periphery, each of which is elongated axially of the rotor and has a base wall of concave circular curvature;
   a plurality of axially extending rotary pistons, one for each recess, each said rotary piston having a basically circular cross section conforming to the base wall curvature of the recesses in the rotor, and each said rotary piston being engaged by a recess in the rotor;
   each rotary piston including a radially outwardly opening side pocket which is elongated axially of the piston and has a base wall of concave circular curvature;
   said peripheral wall of said stator including a plurality of radially inwardly projecting lobes, each of which is elongated axially of the rotor and presents a convex surface of circular curvature which substantially conforms to the curvature of the base walls of the pockets in the rotary pistons;
   said peripheral wall of said stator between the lobes being spaced radially outwardly from the periphery of the rotor, said wall between the lobes having an inner surface of circular curvature;
   said rotary pistons projecting radially outwardly beyond the periphery of the rotor to positions contiguous the inner surface of the peripheral wall of the stator;
   means connecting the rotary pistons and the rotor together such that the rotary pistons will rotate about their individual axes in one direction, and the rotor will rotate about its axis in the opposite direction, and as it rotates it will carry the rotary pistons with it;
   an inlet in the stator leading into a space between a pair of said lobes, and positioned closely adjacent the first lobe of said pair of lobes;
   means for deliverying a lean fuel/air explosive charge to said inlet;
   an ignition device providing an igntion zone in an ignition chamber formed in the second lobe of said pair of lobes, said ignition chamber being a recess in said second lobe which is offset from the center of the lobe towards the inlet, and said convex surface of the second lobe and said concave surface of the rotary piston cavity nearly contacting each other in the region surrounding the ignition chamber when the lobe and cavity are meshing;
   an exhaust outlet in the stator spaced angularly from the second lobe in the direction of rotor rotation;

wherein the drive connection between the rotary pistons and the rotor is coordinated such that as the rotor rotates the pocket regions of the rotary pistons move sequentially first into and then out from engagement with each stator lobe as the rotary piston is carried past such stator lobe;

wherein the rotary pistons, as they move through the regions between the stator lobes during rotor rotation, present closed peripheral surfaces which are contiguous the inner surface of the peripheral wall of the stator between the lobes;

wherein movement of a rotary piston past the inlet causes a suction at the inlet, for drawing the explosive charge into the space between said first and second lobes;

and wherein the explosive charge is compressed between the second stator lobe and the base wall of the pocket in said rotary piston and is compressed into said ignition chamber when said pocket region of the rotary piston engages the second stator lobe; and ignition control means for energizing the ignition means when the second stator lobe and the rotary piston pocket are engaged, to igntie the explosive mixture in the ignition chamber, for creating an explosive force acting between the stator and the rotary piston to cause an increment of rotation of the rotor.

2. A rotary internal combustion engine according to claim 1, wherein the stator includes only two lobes positioned diametrically opposite each other on opposite sides of the rotor, and said engine includes only two rotary pistons and said rotary pistons and the recesses in which they are engaged are spaced diametrically across the rotor, and wherein the exhaust passageway is positioned adjacent the first lobe, on the side of said lobe opposite the inlet.

3. A rotary internal combustion engine according to claim 1, wherein the stator includes only a single pair of lobes and said lobes are positioned diametrically opposite each other on opposite sides of the rotor, and wherein said engine comprises only four rotary pistons set ninety degrees apart from each other, and wherein said exhaust outlet is spaced adjacent the first lobe, on the side of said lobe opposite the inlet.

4. A rotary internal combustion engine according to claim 1, wherein said stator includes four lobes spaced ninety degrees apart, and the third lobe is positioned diametrically opposite the first lobe, and the fourth lobe is positioned diametrically opposite the second lobe, said stator including a second inlet leading into the chamber space between the third and fourth lobes, said second inlet being positioned closely adjacent the third lobe, a second ignition device providing an ignition zone in a central portion of the third lobe, and a second exhaust outlet in the stator positioned adjacent the first lobe, on the side of said lobe opposite the first inlet, and wherein the first outlet is positioned adjacent the third lobe, on the side of said lobe opposite the second inlet.

5. A rotary internal combustion engine according to claim 1, comprising a pair of rotor end plates in said stator, endwise of the rotor and the rotary pistons, and shaft means endwise of the rotary pistons, engaging the rotor end plates and mounting the rotary pistons for rotation relative to said rotor end plates.

6. A rotary internal combustion engine according to claim 5, wherein at one end of the engine the shaft means comprise live shafts connected tot he ends of the rotary pistons, and the rotor end plate at such ends includes openings through which the live shafts projects, and the means connecting the rotary pistons and the rotor together comprises planet gears on said live shafts endwise outwardly of the rotor end plate, and a ring gear secured to the peripheral wall of the stator and including internal teeth in mesh with the planet gears.

7. A rotary internal combustion engine according to claim 6, further comprising a rotary support plate endwise outwardly of the planet gears, said support plate including openings for receiving end portions of the live shafts, and said live shafts projecting at least partially through said openings.

8. A method of generating rotary power, comprising:
providing a stator of a type having a peripheral wall and a pair of endwalls defining a chamber;

providing a rotor within said chamber and mounting said rotor for rotation about a center axis, and providing said rotor with a periphery and a plurality of angularly spaced apart, radially outwardly opening recesses, each of which is elongated axially of the rotor and has a base wall of concave circular curvature;

providing a plurality of axially extending rotary pistons, one for each recess, and providing each rotary piston with a basically circular cross section conforming to the base wall curvature of the recesses in the rotor, and positioning each said rotary piston in a separate recess in the rotor;

providing each rotary piston with a radially outwardly opening side pocket which is elongated axially of the piston and has a base wall of concave circular curvature;

providing the peripheral wall of the stator with a plurality of radially inwardly projecting lobes, each of which is elongated axially of the rotor and presents a convex surface of circular curvature which substantially conforms to the curvature of the base walls of the pockets of the rotary pistons, so that the convex lobe surface and the concave surface of the recess are in near contact when the lobe and recess are meshing;

between said lobes spacing the peripheral wall of the stator radially outwardly from the periphery of the rotor;

between the lobes providing the peripheral wall with an inner surface of circular curvature;

wherein said rotary pistons project radially outward beyond the periphery of the rotor to positions contiguous the inner surface of the peripheral wall of the stator;

connecting the rotary pistons and the rotor together such that the rotary pistons will rotate about their individual axis in one direction, and the rotor will rotate about its axis in the opposite direction, and as it rotates it will carry the rotary pistons with it;

providing an inlet in the stator leading into a space between a pair of said lobes, and positioning the inlet closely adjacent the first lobe of said pair of lobes;

delivering a lean fuel/air explosive charge to said inlet;

providing an ignition zone in a portion of the second lobe of said pair of lobes;

providing an exhaust outlet in the stator spaced angularly from the second lobe in the direction of rotor rotation;

using the drive connection between the rotary pistons and the rotor to, as the rotor rotates, coordinate the movement of the rotary pistons, so that the pocket regions of the rotary pistons move sequentially first into and then out from meshing engagement with each stator lobe as the rotary piston is carried past said stator lobe;

dimensioning the rotary pistons so that as they move through the regions between the stator lobes during rotor rotation, they will present closed peripheral surfaces which are contiguous the inner surface of the peripheral wall of the stator, between the lobes;

using movement of a rotary piston past the inlet to cause a suction at the inlet, for drawing the explosive charge into a space between said first and second lobes;

providing the lobe which includes the ignition means with a small volume ignition chamber;

compressing the explosive charge between the second stator lobe and the base wall of the pocket between said rotary piston, and compressing it into said ignition chamber, when said pocket region of the rotary piston engages the second stator lobe resulting in a high compression of the lean mixture in said chamber; and energizing the ignition means when the second stator load and the rotary piston pockets are engaged, to ignite the explosive mixture for creating explosive force acting between the stator and the rotary piston to cause an increment of rotation of the rotor, whereby ignition of the highly compressed lean mixture will cause an explosion which applies a sudden increment of rotational force on the rotor assembly.

* * * * *